Sept. 2, 1947.  T. F. STACY  2,426,651
INJECTION MOLDING
Original Filed March 16, 1943   2 Sheets-Sheet 1
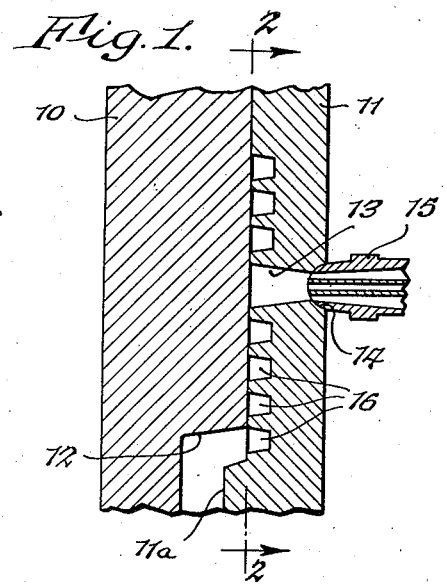
Fig. 1.
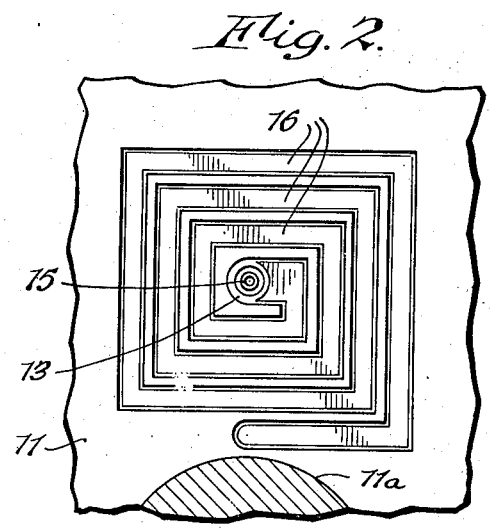
Fig. 2.
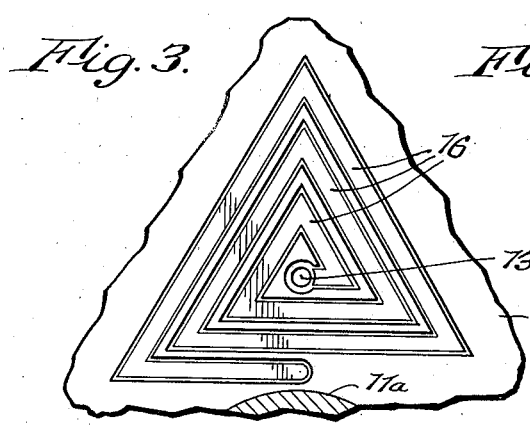
Fig. 3.
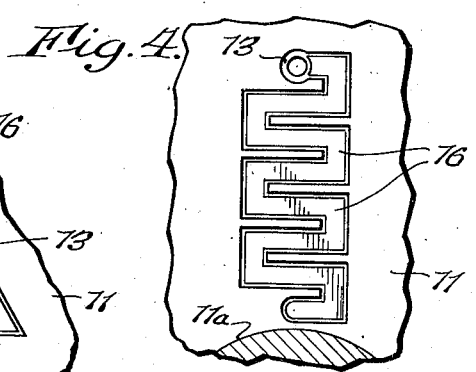
Fig. 4.
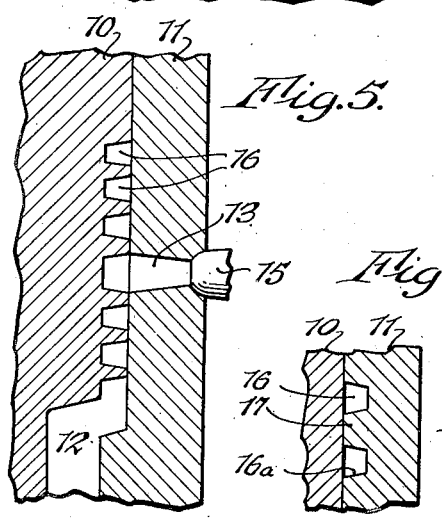
Fig. 5.
Fig. 6.
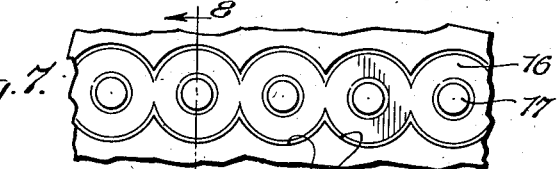
Fig. 7.
Fig. 8.
INVENTOR
Thomas F. Stacy
BY
Parker Prochnow & Farmer
ATTORNEYS

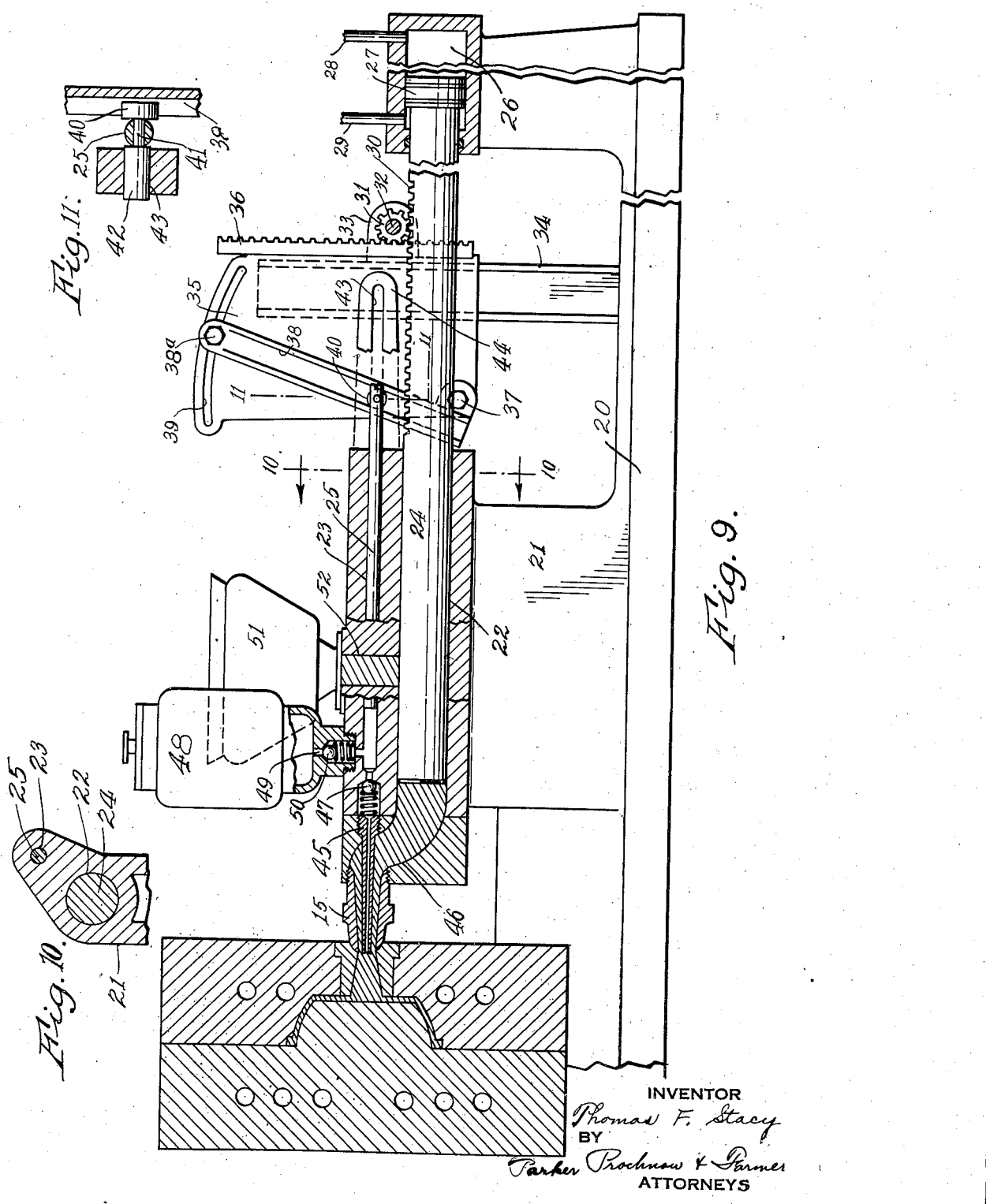

Patented Sept. 2, 1947

2,426,651

UNITED STATES PATENT OFFICE 2,426,651

INJECTION MOLDING

Thomas F. Stacy, Piqua, Ohio, assignor to The French Oil Mill Machinery Company, Piqua, Ohio Substitute for abandoned application Serial No. 479,355, March 16, 1943. This application March 4, 1946, Serial No. 651,749

6 Claims. (Cl. 18—42)

This application is a substitute for abandoned application Serial No. 479,355, filed March 16, 1943.

This invention relates to the molding of resinous materials, and more particularly to materials of the type which harden following the addition thereto of a hardening agent. The thermosetting resins are excellent examples of this type of material, which may be fluids or solids at ordinary temperatures. Such resins when in fluid form or when reduced to fluid form by heating may be molded easily by injection molding. One difficulty with the injection molding of such materials is that such resins should have an added agent to accelerate hardening and thus reduce the time required for hardening, and if such materials with added agent are reduced to liquid form by heat, and stored they tend to polymerize or harden rather rapidly, before they can be used. Hence it has been customary to reduce such resins with agent to fluid form only during the molding operation and as a part thereof.

In the copending application of Thomas F. Stacy and Max D. Farmer, Serial No. 418,640, filed November 12, 1941, there is disclosed and claimed an invention in injection molding of thermosetting resinous materials in which the accelerating or hardening agent is incorporated in withdrawn increments of the resinous material while the latter is in liquid or fluid condition, and before it reaches its final position in the mold cavity. It is highly important that the hardening rate be as rapid as possible after the material is injected into the mold cavity (usually heated), and this invention is in the nature of an improvement upon the invention disclosed in said copending application, in that it relates to a method and apparatus for obtaining more rapid and uniform hardening of the resinous materials disclosed in said application after they reach the mold cavity.

An object of this invention is to provide an improved method and apparatus by which resinous materials may be molded by injection into mold cavities and hardened to self-shape-retaining form in a minimum of time; which will require a minimum of modification of prior methods and apparatus for injection molding; with which the amount of hardening agent required may be kept to a minimum; with which the time required for a molding operation may be reduced to a minimum; and which will be relatively simple, practical and inexpensive.

Other objects and advantages of the invention will be apparent from the following description of several embodiments and examples of the invention, and the novel features will be particularly pointed out hereinafter in connection with the appended claims.

In the accompanying drawings:

Fig. 1 is a sectional elevation through a portion of a two-part mold constructed in accordance with this invention, with the injection nozzle shown in section and applied to the mold;

Fig. 2 is a sectional elevation of the same, approximately along the line 2—2 of Fig. 1, so as to show one example of the groove or passage between the sprue and the mold cavity;

Fig. 3 is a sectional elevation, similar to Fig. 2, but illustrating another embodiment of the invention differing from those of Figs. 1 and 2 in the manner in which the passage formed by the groove is given repeated and substantial changes in direction of progress;

Fig. 4 is another sectional elevation similar to Figs. 2 and 3, but illustrating still another embodiment of the invention, by showing another type of groove or passage for connecting the sprue and the mold cavity;

Fig. 5 is a sectional elevation, similar to Fig. 1, but illustrating the groove as formed in the section having the mold cavity instead of in the section having the sprue;

Fig. 6 is a sectional elevation of a portion of the mold of any of the examples of Figs. 1 to 5, or of other examples, in which the passage is formed by aligned grooves in both of the abutting faces of the mold sections in a manner to form an undulatory passage;

Fig. 7 is a sectional elevation of a portion of one section of the die, and similar to Figs. 2 to 4, but illustrating another type of groove for causing eddying of the stream passing between the sprue and the mold cavity;

Fig. 8 is a transverse, sectional elevation of the same, with the section taken approximately along the line 8—8 of Fig. 7;

Fig. 9 is a longitudinal sectional elevation through apparatus for delivering the resin and catalyst in measured and proportional quantities under pressure;

Fig. 10 is a transverse sectional elevation through a portion of the same, the section being taken approximately along the line 10—10 of Fig. 9; and Fig. 11 is another sectional elevation of a portion of the same, the section being taken approximately along the line 11—11 of Fig. 9.

In the embodiment of the invention illustrated in Figs. 1 and 2, the mold is made up of a plurality of abutting sections, two of such sections 10 and 11 being shown in this particular example, although it will be understood that any number of abutting sections may be used in order to provide a desired multi-part mold. In one of these sections, such as 10, the mold cavity 12 is formed of the desired shape and size, with one side or wall of the cavity formed by the abutting face of another section such as 11, which may have, if desired, a projection 11a thereon extending into the mold cavity formed in the first section 10. The section 11 is also provided with a tapered sprue 13 by which the resinous material to be molded may be admitted in fluid form to the cavity 12, and in accordance with this invention, the sprue 13 is disposed laterally to one side of and spaced from the cavity 11. The sprue 13 is usually formed in the section which does not contain the mold cavity 12, and such a sprue may be divergent in a direction towards the opposing faces between the sections, or toward the mold cavity, as usual in injection molding apparatus.

The outer end of the sprue 13 has a concave seat 14 which receives the convex end of an injection nozzle 15, through which the fluid resinous material to be molded is discharged under pressure into the sprue 13. Any suitable injection nozzle 15 may be employed, and it is separable from the seat 14 of the mold between molding operations when desired, as is understood in this art. Such a nozzle 15 and delivery mechanism may, for convenience, be of the type shown in said prior Stacy and Farmer application, hereinabove identified, or it may be formed in any other suitable manner, so as to discharge into the sprue a quantity of the resin to be molded and a proportional quantity of a hardening agent.

The face of the mold section 11 which abuts the section 10 is provided with a channel or groove 16 which is generally somewhat spiral or tortuous and opens at one end into the sprue 13 and at its other end into the mold cavity 12. This groove 16 is closed along its open face by the abutting face of the section 10, so that it provides a confined passage connecting the sprue 13 and the mold cavity 12, through which the resinous material and hardening agent must pass in reaching the mold cavity. This passage is decidedly tortuous with substantial changes in direction of progress, so that the stream of molding resin and hardening agent passing to the mold cavity from the sprue will be subjected to sufficient agitation and eddying that will cause a thorough mixing of the hardening agent and resin before the two reach the mold cavity 12. Any suitable way of obtaining such a tortuous passage or changes in direction of travel of the confined stream of resin and hardening agent may be employed, that shown in Fig. 2 being a generally spiral form with straight sections connected by angular sections or turns of about 90 degrees.

In Fig. 3, the adjacent stretches of the passage connected by angular turns of more than 90 degrees provide a figure somewhat resembling a spiral triangle, the angular changes being more abrupt that in Fig. 2.

In Fig. 4, a still different type of tortuous passage is shown for the groove 16.

Figs. 7 and 8 illustrate how the straight stretches of the passage or groove can be further modified to form a tortuous passage 16 and cause eddying or mixing of the contents of the stream passing along the same. In this instance, the groove 16 is formed by milling shallow cylindrical cavities 16a, in the face of the section 11, so that the cavities intersect one another, with islands or pins 17 in the centers of the cylindrical cavities so as to divide the stream and thereby cause additional agitation or eddying of the stream. This arrangement with islands, as shown in Figs. 7 and 8, may be employed in any of the sections of the groove 16 shown in Figs. 1 to 5.

Obviously, any portion of the groove or passage 16, and particularly the straight sections thereof, may be further formed to increase the eddying or agitation of the stream. For example, the grooves may be formed partly in each of the abutting faces between two sections, by milling cylindrical convex cavities 18 in aligned portions of the abutting faces, as shown in Fig. 6, so as to form hills and valleys in the portions of the groove provided in the opposite faces. Each valley should be approximately aligned with a hill of the corresponding part of the groove in the other section. In this manner, the passage will undulate back and forth in directions across the plane of the abutting faces between the sections, and the fluid, resinous material in passing from the sprue 13 to the cavity 12, as it moves along this undulatory passage, will be caused to move back and forth and eddy to a substantial extent, which will thoroughly mix the hardening agent with the resinous material.

In Figs. 1 to 4, the groove 16 is shown as formed entirely in the mold section having the sprue 13 and with which the injection nozzle 15 is engaged and disengaged, so that when one desires to mold articles of a different shape or configuration, the same section 11 with groove 16 may be employed with another section 10 having a different mold cavity, and it is only necessary to change the section 10 which carries the mold cavity. This makes it unnecessary to form the tortuous groove when making each mold cavity, since te same section 11 may be used with a plurality of different sections 10 having different mold cavities therein. However, in Fig. 5, I have illustrated an example in which the groove 16 is formed entirely in the section 10 having the mold cavity 12 therein. It will also be understood that the groove may be formed partly in one and partly in the other section, if desired, particularly when one desires to use the undulatory arrangement of Fig. 6.

Similarly, the type of groove shown in Figs. 7 and 8 may be formed entirely in one mold section alone, or partly in one and partly in the other. For example, the islands 17 may be formed on one section, such as 10, and the cylindrical cavities or recesses formed in the other section, such as 11. Obviously, other modifications and combinations of these features may be employed in order to meet particular problems of injection molding, and to give the desired degree of mixing of the resinous material and the hardening agent before the mixture reaches its final position in the mold cavity.

After the cavity has been completely filled with this mixture, as explained, the material in the nozzle 15 is kept under pressure until the resinous material in the cavity 12 has hardened until it is self-shape-retaining, after which it may be removed and the mold used for the manufacture of additional similar articles. This sustained pressure is desirable in order to keep the mold cavity entirely filled, until the material in the mold cavity can harden sufficiently to retain its original shape.

The resinous material and the hardening agent may be any of those which harden from a fluid condition following the addition thereto of a hardening agent. Such materials and agents are available in the market. Those preferred are the thermosetting resins, such as the phenolaldehyde condensation resins which advance from an intermediate stage, in which they may be rendered fluid by heat, to a final solid stage by polymerization that is accelerated by the addition thereto of a catalyst or accelerating agent, such as hexamethylenetetramine. Other examples are set forth in said copending application hereinbefore identified. The walls of the groove 16 and the sprue are, of course, given a slight divergence toward the parting face between the sections so as to facilitate removal of the mixture that hardens in the sprue and in the groove 16.

Any suitable mechanism may be employed for delivering the mixture of catalyst and resin to be molded, into the mold and one example of such mechanism, as disclosed in said Stacy and Farmer application, is shown in Figs. 9 to 11. This delivery mechanism includes a base 20 having an upstanding portion 21 containing a relatively large cylinder or chamber 22 and a relatively small cylinder or chamber 23. A piston 24 fits and reciprocates in the cylinder 22, and a piston 25 fits and reciprocates in a cylinder 23. The piston 24 extends into a chamber 26 and therein carries a piston head 27. Pipes 28 and 29, suitably controlled, admit operating fluid under pressure alternately to opposite ends of the chamber 26, so as to cause reciprocations of the piston 24. The piston 24 carries rack teeth 30 which mesh with, and drive, a pinion 31 in a shaft 32 which is rotatably supported in a bearing 33 carried by an upright standard 34 of the base. A plate 35 is confined on the standard 34 for vertical, reciprocatory, sliding movement thereon, and it carries a rack bar 36 which meshes with the pinion 31. The pinion is long enough to mesh with teeth 30 of the piston 24 and also with the vertically moving rack bar 36. As the piston 24 reciprocates it moves the plate 35 upwardly and downwardly.

Hinged to this plate at 37 is a guide 38 with its other end provided with a clamp bolt 38a which moves in an arcuate slot 39 that has a center of curvature at 37, is releasably secured in different adjusted positions along the slot 39 to place guide 38 in selected angular positions on plate 35. A roller 40 which runs in a channel of the guide 38 is fixed on one end of a stub shaft 41 (Fig. 11) that is rotatably mounted in the small piston 25, and this shaft at its end opposite the roller 40 also carries a roller 42 which runs in a slot 43 provided in a bracket bearing 44. The plate 35 moves vertically at the same time that the piston 24 is moving endwise, and the channel member 38 thereon will have a cam action on the roller 40 and through it move the smaller piston 25 endwise and in the same direction, but proportionately through a distance depending upon the angular position of the guide 38 on the plate 35. The small cylinder 23 at its forward end opens into a small, long, tubular nozzle 45 which extends into and along an offset passage 46 forming a continuation of the larger cylinder 22. The end of the nozzle 45 terminates approximately at the end of the offset passage 46. A small, ball check valve 47 is provided in the passage between the cylinder 23 and the nozzle 45, so as to pass fluid from the cylinder 23 into the passage of the nozzle 45 but seat automatically to prevent reverse flow.

A reservoir 48, secured to the upper part of the upright 21, has a passage 49 opening downwardly therefrom into the forward end of the cylinder 23 and carries a ball check valve 50 which opens to pass fluid from the reservoir 48 to the chamber 23. Valve 50 is spring operated into closed position automatically to prevent reverse flow. Similarly a reservoir 51, also provided on the upper part of the upright 21, has a passage 52 leading to cylinder 22. The forward end of the upright 21, carries a removable nozzle 15 which forms a continuation of the passage 46, and through it the nozzle 45 extends. When the pistons 24 and 25 are retracted, increments of fluids will be drawn from the reservoirs 48 and 51 into the cylinders 23 and 22 respectively, and that when the pistons 24 and 25 are advanced, these increments of fluid will be delivered simultaneously into the mold at the exit end of the nozzle 15, all as explained in greater detail in said Stacy and Farmer application.

It will be understood that various changes in the details, materials and arrangements of parts, which have been herein described and illustrated in order to explain the nature of the invention, may be made by those skilled in the art within the principle and scope of the invention, as expressed in the appended claims.

I claim as my invention:

1. The method of injection molding of a resinous material of a type which may harden to a solid object following the addition thereto of a hardening agent, which comprises storing a quantity of said material in fluid condition, withdrawing said material in increments, injecting said withdrawn increments under a substantial pressure differential into a closed cavity of a mold, until the cavity is entirely filled with said material, adding to said increments before their injection into said cavity, a non-gaseous agent which causes a material acceleration of the hardening of said material, conducting the mixture of agent and material as a confined stream in its passage to said cavity, causing repeated and substantial eddying and mixing of said agent and materials in their travel to said cavity, and holding said mixture in said cavity under sufficient pressure to keep the cavity entirely filled until the contents of said cavity harden to a self-shape-retaining body.

2. The method of injection molding of a resinous material of a type which may harden to a solid object following the addition thereto of a hardening agent, which comprises storing a quantity of said material in fluid condition, withdrawing said material in increments, injecting said withdrawn increments under a substantial pressure differential into a closed cavity of a mold, until the cavity is entirely filled with said material, adding to said increments before their injection into said cavity, a non-gaseous agent which causes a material acceleration of the hardening of said material, conducting the mixture of agent and material as a confined stream in its passage to said cavity, causing repeated and substantial tortuous travel of said stream throughout the major part of its travel to said cavity, whereby the contents of the stream will be mixed by the eddying in the stream caused by such tortuous travel, and holding said material in said cavity under sufficient pressure to keep the cavity entirely filled until the contents of the cavity harden to a self-shape-retaining body.

3. The method of injection molding of a resinous material of a type which may harden to a solid object following the addition thereto of a hardening agent, which comprises storing a quantity of said material in fluid condition, withdrawing said material in increments, injecting said withdrawn increments under a substantial pressure differential into a closed cavity of a mold, until the cavity is entirely filled with said material, adding to said increments before their injection into said cavity, a non-gaseous agent which causes a material acceleration of the hardening of said material, conducting the mixture of agent and material as a confined stream in its passage to said cavity, causing repeated and substantial undulatory travel of said stream in a direction crosswise of the general direction of progress of said stream to said cavity and in directions toward and from the face between the sections sufficiently to cause a thorough mixing of the agent and materials during their travel toward said cavity, and holding said mixture in said cavity under sufficient pressure to keep the cavity entirely filled until the contents of said cavity harden to a self-shape-retaining body.

4. Apparatus for injection molding of resinous material of a type which hardens to a solid following the addition thereto of a hardening agent, which comprises a multi-section mold having a mold cavity opening into the abutting faces between sections, and a sprue extending from the space between abutting faces of the sections outwardly and terminating in an outwardly facing seat, a nozzle device removably fitting said seat, and means for delivering concurrently through said nozzle into said sprue, streams of said resinous material and hardening agent in fluid form, said mold having therein and exposed at a face between abutting sections, a tortuous passage with frequent abrupt changes of direction of progress connecting said mold cavity and said sprue, whereby the mixture in reaching said cavity from said nozzle device will be thoroughly mixed, and when the sections are separated, said tortuous passage will be uncovered for cleaning throughout its entire length.

5. Apparatus for injection molding of resinous material of a type which hardens to a solid following the addition thereto of a hardening agent, which comprises a multi-section mold having a mold cavity opening into the abutting faces between sections and a sprue extending from the space between abutting faces of the sections outwardly and terminating in an outwardly facing seat, a nozzle device removably fitting said seat, and means for delivering concurrently through said nozzle into said sprue, streams of said resinous material and hardening agent in fluid form, said mold having a passage connecting said cavity and said sprue constituting a groove along the abutting faces of said sections, opposed walls of said groove formed by said sections being undulated in a direction toward and from the general plane of the face between the abutting sections, with the hills in one section disposed opposite the valleys in the opposed wall of the groove, whereby when the mixture of resin and hardening agent is discharged into said sprue and conducted therefrom through said passage to said cavity, the mixture will pass a confined stream through said passage and be turned back and forth within the passage and caused to thoroughly mix before reaching said cavity.

6. Apparatus for injection molding of resinous material of a type which hardens to a solid following the addition thereto of a hardening agent, which comprises a multi-section mold, one of said sections having a mold cavity therein which is closed on one side by the abutting face of the other section, said other section having a sprue connecting the exterior face thereof to the abutting faces of said sections at a substantial distance across said abutting faces from said cavity, the outer end of said sprue being surrounded with a seat to receive the complementary end of a nozzle through which a mixture of a resinous material and a hardening agent may be discharged into the sprue, a passage connecting said sprue and said cavity and formed entirely as a groove in that face of said other section which abuts said one section, but closed by said one section, said passage having a plurality of substantial changes in direction to produce a tortuous course as it progresses from said sprue to said cavity, whereby the fluid discharged into the sprue and passing to said cavity will be agitated sufficiently to cause a substantial mixing of the agent and resinous material before it reaches said cavity.

THOMAS F. STACY.